Patented Jan. 20, 1953

2,626,258

UNITED STATES PATENT OFFICE 2,626,258

SERIES OF NITROFURAN COMPOUNDS COMPRISING THE ACYL HYDRAZONE AMMONIUM SALTS OF 5-NITROACYL FURANS

William C. Ward, Norwich, N. Y., assignor to Eaton Laboratories, Inc., Norwich, N. Y., a corporation of New York No Drawing. Application May 29, 1950, Serial No. 165,111

5 Claims. (Cl. 260—240)

This invention relates to chemotherapeutically active nitrofuran derivatives having high water solubility as contrasted to previously disclosed chemotherapeutically active compounds of the nitrofuran series having a very limited solubility in water.

I have discovered that high water solubility can be conferred on chemotherapeutically active nitrofuran derivatives without sacrificing their chemotherapeutic activity by employing as part of the molecule a quaternary ammonium salt. Such derivatives are effective in the protection of animals infected with lethal doses of streptococci, trypanosomes and S. typhi. By in vitro test the bacteriostatic and bactericidal effects of these derivatives is found to extend to a wide field of both gram-positive and gram-negative bacteria and they conform in this respect with the broad antibacterial spectrum of other nitrofurans. A further advantage of the water-soluble chemotherapeutic nitrofuran derivatives which I have invented is that they can be administered by the parenteral route, an avenue heretofore restricted due to the insolubility of previously known nitrofurans in menstruum acceptable for such therapy.

The new series of water-soluble chemotherapeutic nitrofuran derivatives which I have invented is referred to by the generic term acylhydrazone quaternary ammonium salts of nitroacylfurans.

They are represented by the general formula:

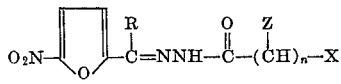

in which

R = hydrogen or an alkyl group containing from 1 to 8 carbon atoms

Z = hydrogen or an alkyl group containing from 1 to 17 carbon atoms n = 1 to 11 when Z=hydrogen, and 1 when Z= an alkyl group X = a group containing as a soluble salt a quaternary nitrogen atom in a cyclized ring or having linked thereto at least two lower alkyl substituents and one aryl or aralkyl or additional lower alkyl substituent.

In order that the invention may be entirely available to those skilled in the art, methods for making a number of new compounds of the series are described briefly:

EXAMPLE 1

*5-nitro-2-furaldehyde acethydrazone pyridinium chloride*

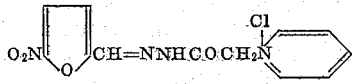

To 5 grams of acethydrazide pyridinium chloride dissolved in 50 ml. of boiling ethyl alcohol is added dropwise with stirring 3.8 grams of 5-nitro-2-furaldehyde dissolved in 20 ml. of ethanol. After a short time precipitation occurs. Stirring is continued for one-half hour to insure complete reaction. At this time the reaction mixture is filtered. The crystals obtained (8 grams) are recrystallized from a 75:25 ethyl alcohol-water mixture. No definite melting point is observed; decomposition is found at 285–288° C. Analysis reveals this composition:

Calc. _____ C=46.35, H=3.54, Cl=11.56
Fd. _____ C=46.38, H=3.72, Cl=11.23

EXAMPLE 2

*5-nitro-2-furaldehyde acethydrazone trimethyl ammonium chloride*

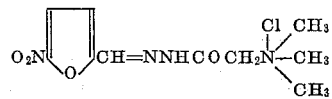

To 10 grams of trimethyl acethydrazide ammonium chloride dissolved in 50 ml. of boiling ethanol is added dropwise with stirring 8.5 grams of 5-nitro-2-furaldehyde dissolved in 30 ml. of ethanol. In a short time precipitation ensues and upon cooling crystallization is almost quantitatively complete. Filtration yields the product (15 gms.) having a melting point of 239–242° C. (w. decomp.). Recrystallization may be effected from an ethyl alcohol-water mixture or from isopropanol.

EXAMPLE 3

*5-nitro-2-furyl n-heptyl ketone acethydrazone pyridinium chloride*

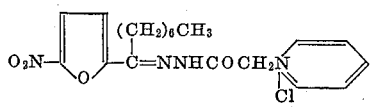

To 8 gms. of acethydrazide pyridinium chloride dissolved in 100 cc. of boiling ethanol is added 10 gms. of 5-nitro-2-furyl n-heptyl ketone and the solution heated under reflux for one hour. The solution is cooled at 0° C. for two hours whereupon an oil separates. The solvent is decanted and the oil slurried with anhydrous alcohol which causes crystallization to come about. The yellow solid is filtered and recrystallized from isopropanol.

Yield 60%, M. P. 160–162° C.

Analysis reveals this composition:

|   | Calc. | Fd. |
|---|---|---|
| C | 55.88 | 55.93 |
| H | 6.13 | 5.84 |

EXAMPLE 4

*5-nitro-2-furaldehyde 11-dimethylamino-undecoylhydrazone methobromide*

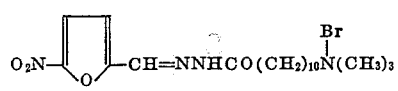

To 15 grams of 11-dimethylaminoundecoyl-hydrazide methobromide dissolved in 60 cc. of ethanol at room temperature is added 9.5 gms. of 5-nitro-2-furaldehyde. This solution of reactants is allowed to stand for one-half hour and then ether is added causing precipitation of an oil. The ether-alcohol mixture is decanted and 15 cc. of isopropanol added to the oil. Crystallization of the oil is induced upon stirring for 30 minutes with the isopropanol. The crystals are filtered and dried.

Yield 69%, M. P. 150–152° C.

Analysis reveals this composition:

|   | Calc. | Fd. |
|---|---|---|
| C | 49.46 | 49.17 |
| H | 7.21 | 7.16 |
| Br | 17.32 | 17.52 |

What I claim is:

1. A compound having chemotherapeutic activity and high water solubility, consisting of a member of the group represented by the formula:

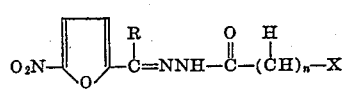

in which

R represents a member of the group consisting of hydrogen and an alkyl radical containing from 1 to 8 carbon atoms $n$ equals 1 to 11

X represents a member of the group consisting of

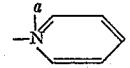

and

wherein $a$ represents a member of the group consisting of Cl and Br $b$ represents lower alkyl.

2. 5-nitro-2-furaldehyde acethydrazone pyridinium chloride represented by the formula:

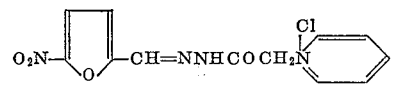

3. 5-nitro-2-furaldehyde acethydrazone trimethyl ammonium chloride represented by the formula:

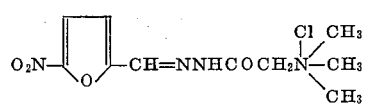

4. 5-nitro-2-furyl n-heptyl ketone acethydrazone pyridinium chloride represented by the formula:

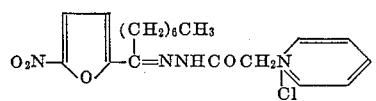

5. 5-nitro-2-furaldehyde 11-dimethylamino-undecoylhydrazone methobromide represented by the formula:

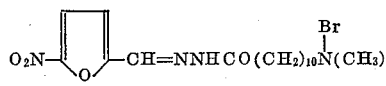

WILLIAM C. WARD.

REFERENCES CITED

The following references are of record in the file of this patent:

Dreizen, Chem. Abst. (1949), vol. 43, p. 6735.
Dreizen, J. Dental Research, 28, pp. 288–297 (1949).